United States Patent
Hsieh et al.

(10) Patent No.: US 9,588,552 B2
(45) Date of Patent: Mar. 7, 2017

(54) ATTACHING ELECTRICAL COMPONENTS USING NON-CONDUCTIVE ADHESIVE

(71) Applicant: Sentons Inc., Grand Cayman (KY)

(72) Inventors: Yenyu Hsieh, San Jose, CA (US);
Samuel W. Sheng, Saratoga, CA (US);
Shih-Ming Shih, San Jose, CA (US);
Robert G. Nelson, Morgan Hill, CA (US)

(73) Assignee: Sentons Inc. (KY)

( * ) Notice: Subject to any disclaimer, the term of this patent is extended or adjusted under 35 U.S.C. 154(b) by 171 days.

(21) Appl. No.: 14/024,374

(22) Filed: Sep. 11, 2013

(65) Prior Publication Data
US 2015/0070597 A1    Mar. 12, 2015

(51) Int. Cl.
| | | |
|---|---|---|
| *G02F 1/1335* | (2006.01) | |
| *G06F 1/16* | (2006.01) | |
| *G06F 3/041* | (2006.01) | |
| *G06F 3/043* | (2006.01) | |

(52) U.S. Cl.
CPC .............. *G06F 1/169* (2013.01); *G06F 3/041* (2013.01); *G06F 3/043* (2013.01); *G06F 3/0418* (2013.01); *G06F 2203/04103* (2013.01); *G06F 2203/04104* (2013.01); *Y10T 29/4913* (2015.01)

(58) Field of Classification Search
CPC ........ G06F 1/169; G06F 3/041; G06F 3/0436; G06F 2203/04103; Y10T 29/4913
See application file for complete search history.

(56) References Cited

U.S. PATENT DOCUMENTS

| | | |
|---|---|---|
| 5,739,479 A | 4/1998 | Davis-Cannon et al. |
| 5,784,054 A | 7/1998 | Armstrong et al. |
| 5,883,457 A | 3/1999 | Rinde et al. |
| 6,091,406 A | 7/2000 | Kambara et al. |
| 6,254,105 B1 | 7/2001 | Rinde et al. |
| 6,473,075 B1 | 10/2002 | Gomes et al. |
| 6,535,147 B1 | 3/2003 | Masters et al. |
| 6,567,077 B2 | 5/2003 | Inoue et al. |
| 6,630,929 B1 | 10/2003 | Adler et al. |
| 6,636,201 B1 | 10/2003 | Gomes et al. |
| 6,856,259 B1 | 2/2005 | Sharp |
| 6,891,527 B1 | 5/2005 | Chapman et al. |
| 6,948,371 B2 | 9/2005 | Tanaka et al. |
| 7,000,474 B2 | 2/2006 | Kent |
| 7,006,081 B2 | 2/2006 | Kent et al. |
| 7,116,315 B2 | 10/2006 | Sharp et al. |
| 7,119,800 B2 | 10/2006 | Kent et al. |
| 7,187,369 B1 | 3/2007 | Kanbara et al. |
| 7,193,617 B1 | 3/2007 | Kanbara et al. |
| 7,204,148 B2 | 4/2007 | Tanaka et al. |
| 7,274,358 B2 | 9/2007 | Kent |

(Continued)

FOREIGN PATENT DOCUMENTS

| | | |
|---|---|---|
| KR | 20110090034 A | 8/2011 |
| KR | 20120116281 A | 10/2012 |

*Primary Examiner* — Paisley L Arendt
(74) *Attorney, Agent, or Firm* — Van Pelt, Yi & James LLP

(57) ABSTRACT

A touch input device is disclosed. The touch input device includes a touch input medium configured to receive a touch input. The touch input device includes a conductive trace coupled to the touch input medium. The touch input device also includes a transducer electrically coupled to the conductive trace and coupled to the touch input medium via a non-conductive adhesive.

17 Claims, 10 Drawing Sheets

(56) References Cited

U.S. PATENT DOCUMENTS

| | | | |
|---|---|---|---|
| 7,315,336 B2 | 1/2008 | North et al. |
| 7,345,677 B2 | 3/2008 | Ing et al. |
| 7,411,581 B2 | 8/2008 | Hardie-Bick |
| 7,456,825 B2 | 11/2008 | Kent et al. |
| 7,511,711 B2 | 3/2009 | Ing et al. |
| 7,545,365 B2 | 6/2009 | Kent et al. |
| 7,583,255 B2 | 9/2009 | Ing |
| 7,649,807 B2 | 1/2010 | Ing |
| 7,683,894 B2 | 3/2010 | Kent |
| 7,800,595 B2 * | 9/2010 | Hill | 345/177 |
| 7,868,874 B2 * | 1/2011 | Reynolds | G06F 3/041 |
| | | | 178/19.07 |
| 7,920,133 B2 | 4/2011 | Tsumura et al. |
| 8,039,959 B2 * | 10/2011 | Beroz | H01L 23/49805 |
| | | | 257/666 |
| 8,085,124 B2 | 12/2011 | Ing |
| 8,228,121 B2 | 7/2012 | Benhamouda et al. |
| 8,237,676 B2 | 8/2012 | Duheille et al. |
| 8,319,752 B2 | 11/2012 | Hardie-Bick |
| 8,325,159 B2 | 12/2012 | Kent et al. |
| 8,378,974 B2 | 2/2013 | Aroyan et al. |
| 8,392,486 B2 | 3/2013 | Ing |
| 8,427,423 B2 | 4/2013 | Tsumura |
| 8,436,808 B2 | 5/2013 | Chapman et al. |
| 8,493,332 B2 | 7/2013 | D'Souza |
| 8,576,202 B2 | 11/2013 | Tanaka et al. |
| 8,619,063 B2 | 12/2013 | Chaine et al. |
| 8,638,318 B2 | 1/2014 | Gao et al. |
| 8,648,815 B2 | 2/2014 | Kent et al. |
| 8,659,579 B2 | 2/2014 | Nadjar et al. |
| 8,670,290 B2 | 3/2014 | Aklil et al. |
| 8,681,128 B2 | 3/2014 | Scharff et al. |
| 8,692,809 B2 | 4/2014 | D'Souza |
| 8,692,810 B2 | 4/2014 | Ing |
| 8,692,812 B2 | 4/2014 | Hecht |
| 8,730,213 B2 | 5/2014 | D'Souza et al. |
| 8,749,517 B2 | 6/2014 | Aklil |
| 8,823,685 B2 | 9/2014 | Scharff et al. |
| 8,854,339 B2 | 10/2014 | Kent et al. |
| 8,890,852 B2 | 11/2014 | Aroyan et al. |
| 8,896,429 B2 | 11/2014 | Chaine |
| 8,896,564 B2 | 11/2014 | Scharff et al. |
| 8,941,624 B2 | 1/2015 | Kent et al. |
| 8,946,973 B2 | 2/2015 | Pelletier |
| 8,994,696 B2 | 3/2015 | Berget et al. |
| 9,046,959 B2 | 6/2015 | Schevin et al. |
| 9,046,966 B2 | 6/2015 | D'Souza |
| 9,058,071 B2 | 6/2015 | Esteve |
| 2004/0233174 A1 | 11/2004 | Robrecht et al. |
| 2011/0298871 A1 | 12/2011 | Stephens et al. |
| 2012/0038558 A1 * | 2/2012 | Fergusson et al. | 345/173 |
| 2013/0141365 A1 | 6/2013 | Lynn et al. |

* cited by examiner

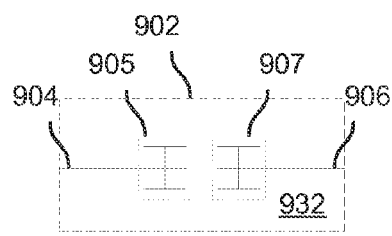
FIG. 9A1
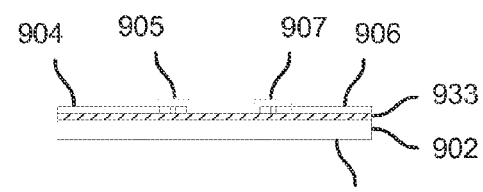
FIG. 9A2
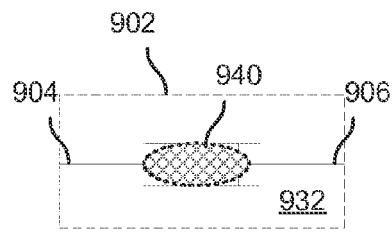
FIG. 9B1
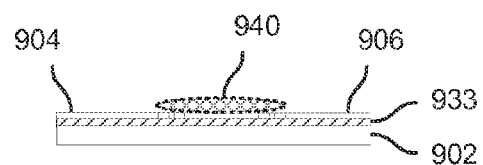
FIG. 9B2
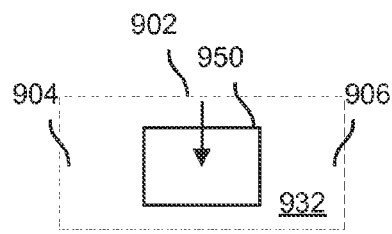
FIG. 9C1
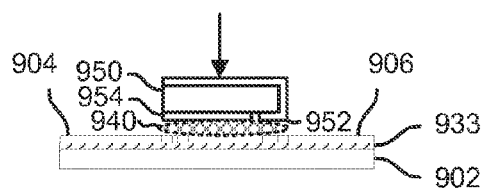
FIG. 9C2
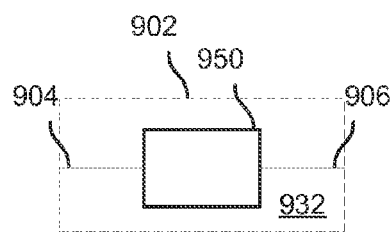
FIG. 9D1
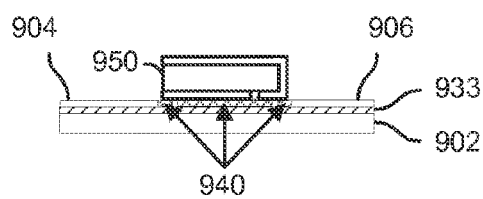
FIG. 9D2
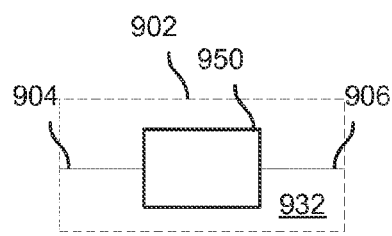
FIG. 9E1
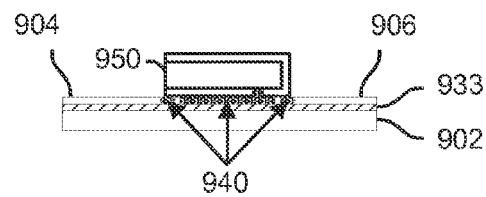
FIG. 9E2

ATTACHING ELECTRICAL COMPONENTS USING NON-CONDUCTIVE ADHESIVE

BACKGROUND OF THE INVENTION

A location of a touch input received on a touch input medium such as a glass of a display may be detected by measuring a disturbance caused by the touch input contacting the touch input medium. Transducers may be attached to the touch input medium to detect the disturbance on the touch input medium. In addition, the transducers have to be electrically connected to circuitry to process the disturbance received by the transducer. The manufacturing process typically involves attaching the transducer to the touch input medium using a first manufacturing process and electrically connecting the transducer to circuitry using a second manufacturing process. Utilizing theses different processes is time consuming and costly. Therefore, there exists a need for a way to more efficiently attach and electrically connect a transducer.

BRIEF DESCRIPTION OF THE DRAWINGS

Various embodiments of the invention are disclosed in the following detailed description and the accompanying drawings.

FIGS. 9A1-9E1 and 9A2-9E2 are diagrams illustrating an example of a process for coupling an electronic component to a touch input medium.

DETAILED DESCRIPTION

Figure 1:
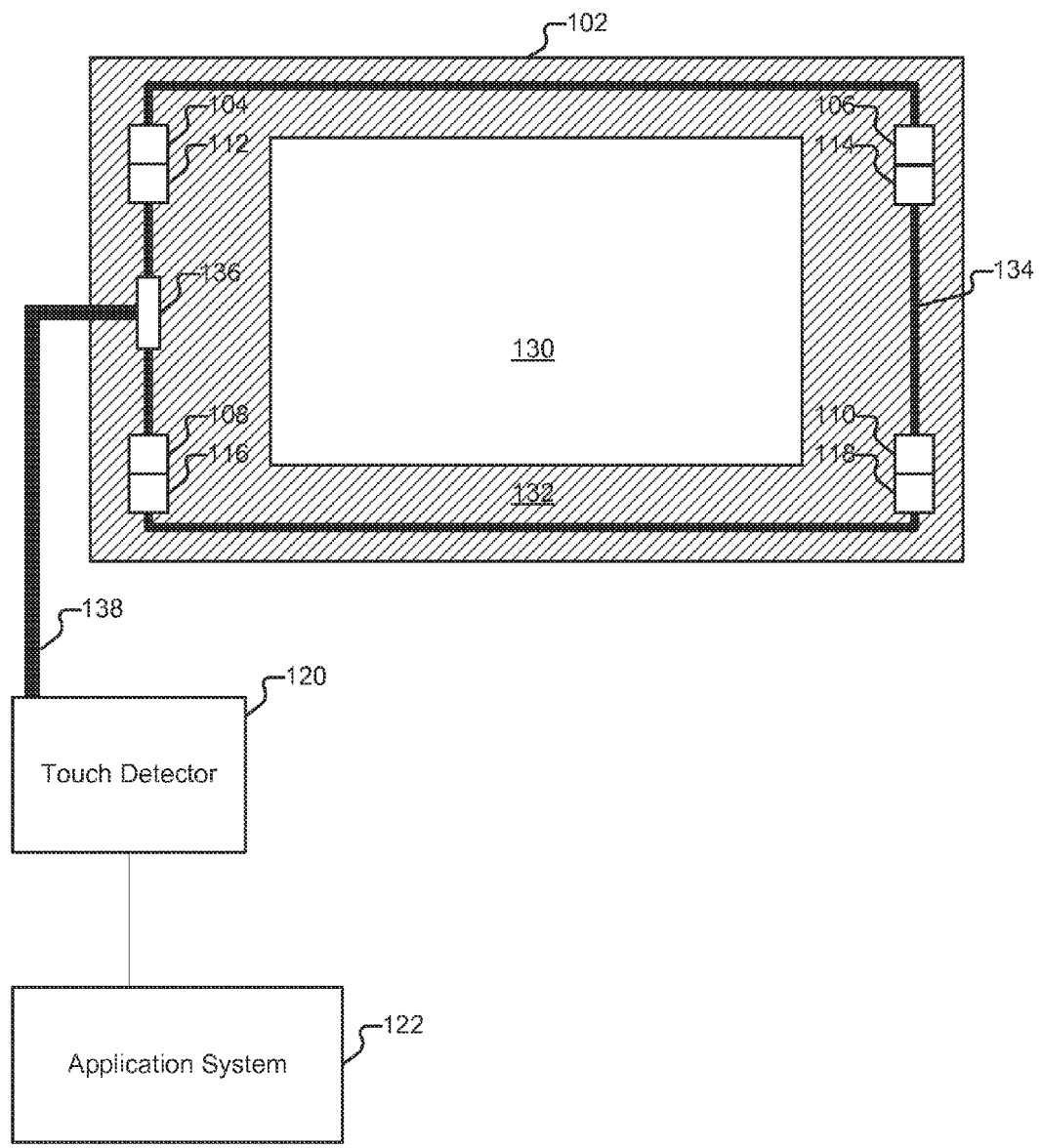
FIG. 1 is a block diagram illustrating an embodiment of a system for detecting a touch input surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A touch input device is disclosed. In some embodiments, the touch input device includes a touch input medium configured to receive a touch input contact. For example, the touch input medium is a glass cover of a touch input screen. The touch input device includes a conductive trace applied to the touch input medium. For example, the conductive traces (e.g., conductive pathways) are printed on the touch input medium in a pattern that connects electrical pads (e.g., where an electrical connection of an electrical component may be attached) of the conductive traces to one or more destinations such as a cable connector where a cable may be attached. The touch input device also includes a transducer electrically coupled to the conductive trace and physically/mechanically coupled to the touch input medium via a non-conductive adhesive. For example, an epoxy is used to attach the transducer to the touch input medium (e.g., to allow the transducer to detect and/or transmit a signal on the touch input medium) and allow the transducer to remain in a position that allows an electrical/physical contact to be maintained between an electrical terminal of the transducer and a conductive trace.

In some embodiments, a touch input location is determined. For example, a user touch input on the glass surface of a display screen is detected. In some embodiments, the touch input includes multiple simultaneous touch contacts (i.e., multi-touch input). For example, a user places two fingers on a touch screen display. In some embodiments, a signal such as an acoustic or ultrasonic signal is propagated freely through a propagating medium with a surface using a transmitter coupled to the medium. When the surface is touched, the propagated signal is disturbed (e.g., the touch causes an interference with the propagated signal). In some embodiments, the disturbed signal is received at a sensor coupled to the propagating medium. By processing the received signal and comparing it against an expected signal, one or more touch contact locations on the surface associated with the touch input are at least in part determined. For example, the disturbed signal is received at a plurality of sensors and a relative time difference between when the disturbed signal was received at different sensors is used to determine time domain signals representing the time differences. In some embodiments, the time domain signals are transformed to determine spatial domain signals representing total distances traveled on the propagating medium by the respective received signals. The spatial domain signals may be compared with one or more expected signals associated with different potential touch contact locations of the touch input to select a potential location that is associated with the closest matching expected signal as the touch contact location.

In some embodiments, the touch input location is used to determine one or more of the following associated with a touch input: a gesture, a coordinate position, a time, a time frame, a direction, a velocity, a force magnitude, a proximity magnitude, a pressure, a size, and other measurable or derived parameters. In some embodiments, by detecting disturbances of a freely propagated signal, touch input detection technology can be applied to larger surface regions with less or no additional cost due to a larger surface region as compared to certain previous touch detection technologies. Additionally, the optical transparency of a touch screen may not have to be affected as compared to resistive and capacitive touch technologies. Merely by way of example, the touch detection described herein can be applied to a variety of objects such as a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces.

FIG. 1 is a block diagram illustrating an embodiment of a system for detecting a touch input surface disturbance. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and sensors 112, 114, 116, and 118. The locations where transmitters 104, 106, 108, and 110 and sensors 112, 114, 116, and 118 have been coupled to propagating signal medium 102, as shown in FIG. 1, are merely an example. Other configurations of transmitter and sensor locations may exist in various embodiments. Although FIG. 1 shows sensors located adjacent to transmitters, sensors may be located apart from transmitters in other embodiments. In some embodiments, a single transducer is used as both a transmitter and a sensor. In various embodiments, the propagating medium includes one or more of the following: panel, table, glass, plastic, polycarbonate, sapphire, screen, door, floor, whiteboard, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may provide a touch input to provide a selection input and a substantially opposite second surface of medium 102 coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

The second surface of medium 102 shown in FIG. 1 includes center area 130 and border area 132. In some embodiments, medium 102 is a transparent medium (e.g., such as glass, sapphire, etc.) and center area 130 is transparent (e.g., to allow a user to view an electronic display screen through medium 102). In some embodiments, border area 132 has been covered with a covering material (e.g., paint, colored epoxy, other attached non-transparent material, etc.) to make border area 132 non-transparent (e.g., to visually hide electronics and wires to a user viewing medium 102 from an opposite surface of the surface exposed to the electronic components and wires). In some embodiments, medium 102 is a non-transparent medium (e.g., metal) and border area 132 may be covered with an electrically insulating layer that electrically isolates medium 102 from wiring, conductive tracing, and/or electronic components coupled to medium 102. In some embodiments, distinction between area 130 and 132 is optional. For example, medium 102 is non-transparent and an entire surface of medium 102 is coated with a uniform insulating layer.

Conductive traces 134 connects transmitters 104, 106, 108, and 110 and sensors 112, 114, 116, and 118 to connector 136. For example, conductive traces 134 includes electrically separate trace lines that individually connect electrical connection terminals of transmitters 104, 106, 108, and 110 and sensors 112, 114, 116, and 118 to the appropriate pin/pad of connector 136. Although FIG. 1 shows conductive traces 134 as a thick solid line to simplify the diagram, conductive traces 134 includes a plurality of individual electrically isolated traces. In some embodiments, conductive traces 134 includes one or more electrical pads that make electrical contact with electrical terminals of transmitters 104, 106, 108, and 110 and sensors 112, 114, 116, and 118. Examples of conductive traces 134 include silver trace, copper trace, carbon trace, Indium tin oxide trace, conductive material particles mixed with an adhesive, and any other conductive material. Conductive traces 134 may have been applied to medium 102 by printing the conductive material on to medium 102 and/or by sputtering the conductive material on to medium 102 and etching away undesired portions of the conductive material on medium 102. Examples of connector 136 include a ribbon cable connector, a flex cable connector, a wiring connector, a cable connector, ACF (anisotropic conductive film) or any other connector that allows conductive traces 134 to be connected to a wiring connected to touch detector 120. In some embodiments, connector 136 is optional. For example, contact pads allow conductive traces 134 to be connected (e.g., via wiring electrically connected to the contact pads) to touch detector 120.

Cable 138 is connected to connector 136 and touch detector 120. Cable 138 may be connected to touch detector 120 via a connector such as a ribbon cable connector, a flex cable connector, a wiring connector, and a cable connector. Cable 138 includes a plurality of electrically isolated electrical pathways/wires. Examples of cable 138 include a ribbon cable, a flex cable, and a bundled wiring. In some embodiments, each electrical pathway/wire of cable 138 corresponds to a different conductive trace included in conductive traces 134. For example, each of electrical connection terminals of transmitters 104, 106, 108, and 110 and sensors 112, 114, 116, and 118 correspond to a different conductive trace included in conductive traces 134 and each of the conductive traces are connected to a different electrical pathway/wire included in cable 138. In some embodiments, touch detector 120 is an integrated circuit chip and each electrical pathway/wire of cable 138 may be connected to a different terminal/pin of touch detector 120. This may allow each of electrical connection terminals of transmitters 104, 106, 108, and 110 and sensors 112, 114, 116, and 118 to be connected to different pins/terminals of touch detector 120.

Examples of transmitters 104, 106, 108, and 110 include piezoelectric transducers, electromagnetic transducers, transmitters, sensors, and/or any other transmitters and transducers capable of propagating a signal through medium 102. Examples of sensors 112, 114, 116, and 118 include piezoelectric transducers, electromagnetic transducers, laser vibrometers, transmitters, and/or any other sensors and transducers capable of detecting a signal on medium 102. In some embodiments, the transmitters and sensors shown in FIG. 1 are coupled to medium 102 in a manner that allows a user's input to be detected in a predetermined region of medium 102. Although four transmitters and four sensors are shown, any number of transmitters and any number of sensors may be used in other embodiments. For example, two transmitters and three sensors may be used. The locations and number of sensors and transmitters may be selected to optimize touch detection performance. In some embodiments, a single transducer acts as both a transmitter and a sensor. For example, transmitter 104 and sensor 112 represent a single piezoelectric transducer. In the example shown, transmitter 104 may propagate a signal through medium 102. Sensors 112, 114, 116, and 118 receive the propagated signal.

Touch detector 120 is connected to the transmitters and sensors shown in FIG. 1. In some embodiments, detector 120 includes one or more of the following: an integrated circuit chip, a printed circuit board, a processor, and other electrical components and connectors. Detector 120 determines and sends a signal to be propagated by transmitters 104, 106, 108, and 110. Detector 120 also receives the signal detected by sensors 112, 114, 116, and 118. The received signals are processed by detector 120 to determine whether a disturbance associated with a user input has been detected at a location on a surface of medium 102 associated with the disturbance. Detector 120 is in communication with application system 122. In some embodiments, detector 120 is in communication with application system 122 using a Universal Serial Bus (USB) protocol.

Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information.

The size and dimensions of the components and areas shown in FIG. 1 are not to scale. Certain features of FIG. 1 have been exaggerated or minimized to simplify the diagram and illustrate the example clearly. In some embodiments, an electronic visual display (e.g., liquid-crystal display, organic light-emitting diode display, etc.) is placed over medium 102 such that a user may view the screen from a surface opposite of the surface shown in FIG. 1 via region 130. In this embodiment, touch detector 120 and application system 122 may be included in a circuit board placed next to and/or behind the display screen. In some embodiments, components shown in FIG. 1 are surrounded by a housing. In some embodiments, components shown in FIG. 1 are included in a device such as a computer device, a smartphone, a table computer, a laptop computer, a desktop computer, a consumer electronic device, an electrical appliance, and/or any other electrical device.

Figure 2:
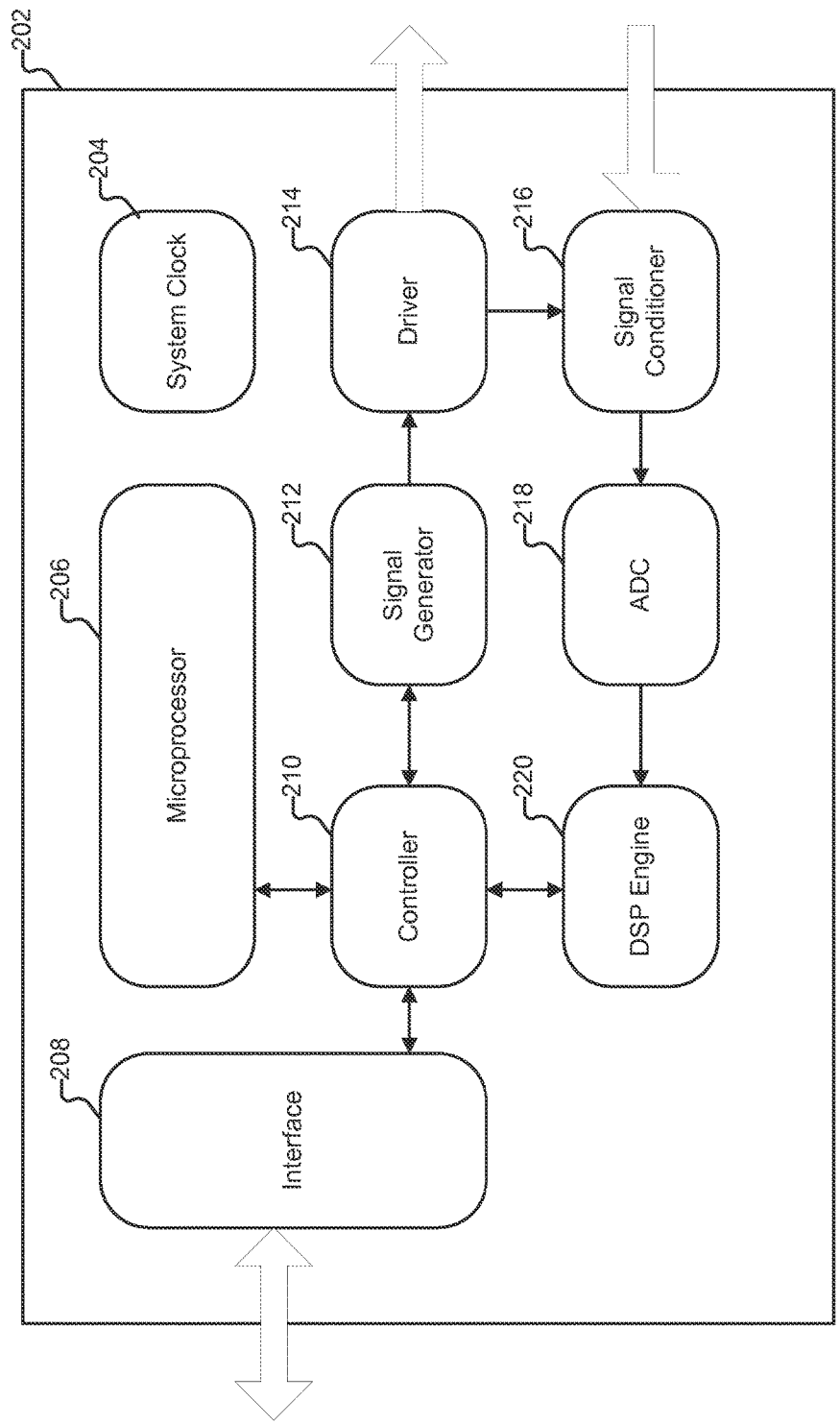
FIG. 2 is a block diagram illustrating an embodiment of a system for detecting a touch input.

FIG. 2 is a block diagram illustrating an embodiment of a system for detecting a touch input. In some embodiments, touch detector 202 is included in touch detector 120 of FIG. 1. In some embodiments, the system of FIG. 2 is integrated in an integrated circuit chip. Touch detector 202 includes system clock 204 that provides a synchronous system time source to one or more other components of detector 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of detector 202. In some embodiments, a memory is coupled to microprocessor 206 and is configured to provide microprocessor 206 with instructions. Signal generator 212 generates a signal to be used to propagate a signal such as a signal propagated by transmitter 104 of FIG. 1. For example, signal generator 212 generates a pseudorandom binary sequence signal. Driver 214 receives the signal from generator 212 and drives one or more transmitters, such as transmitters 104, 106, 108, and 110 of FIG. 1, to propagate a signal through a medium.

A signal detected from a sensor such as sensor 112 of FIG. 1 is received by detector 202 and signal conditioner 216 conditions (e.g., filters) the received analog signal for further processing. For example, signal conditioner 216 receives the signal output by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 correlates the converted signal against a reference signal to determine a time domain signal that represents a time delay caused by a touch input on a propagated signal. In some embodiments, DSP engine 220 performs dispersion compensation. For example, the time delay signal that results from correlation is compensated for dispersion in the touch input surface medium and translated to a spatial domain signal that represents a physical distance traveled by the propagated signal disturbed by the touch input. In some embodiments, DSP engine 220 performs base pulse correlation. For example, the spatial domain signal is filtered using a match filter to reduce noise in the signal.

A result of DSP engine 220 may be used by microprocessor 206 to determine a location associated with a user touch input. For example, microprocessor 206 determines a hypothesis location where a touch input may have been received and calculates an expected signal that is expected to be generated if a touch input was received at the hypothesis location and the expected signal is compared with a result of DSP engine 220 to determine whether a touch input was provided at the hypothesis location.

Interface 208 provides an interface for microprocessor 206 and controller 210 that allows an external component to access and/or control detector 202. For example, interface 208 allows detector 202 to communicate with application system 122 of FIG. 1 and provides the application system with location information associated with a user touch input.

Figure 3:
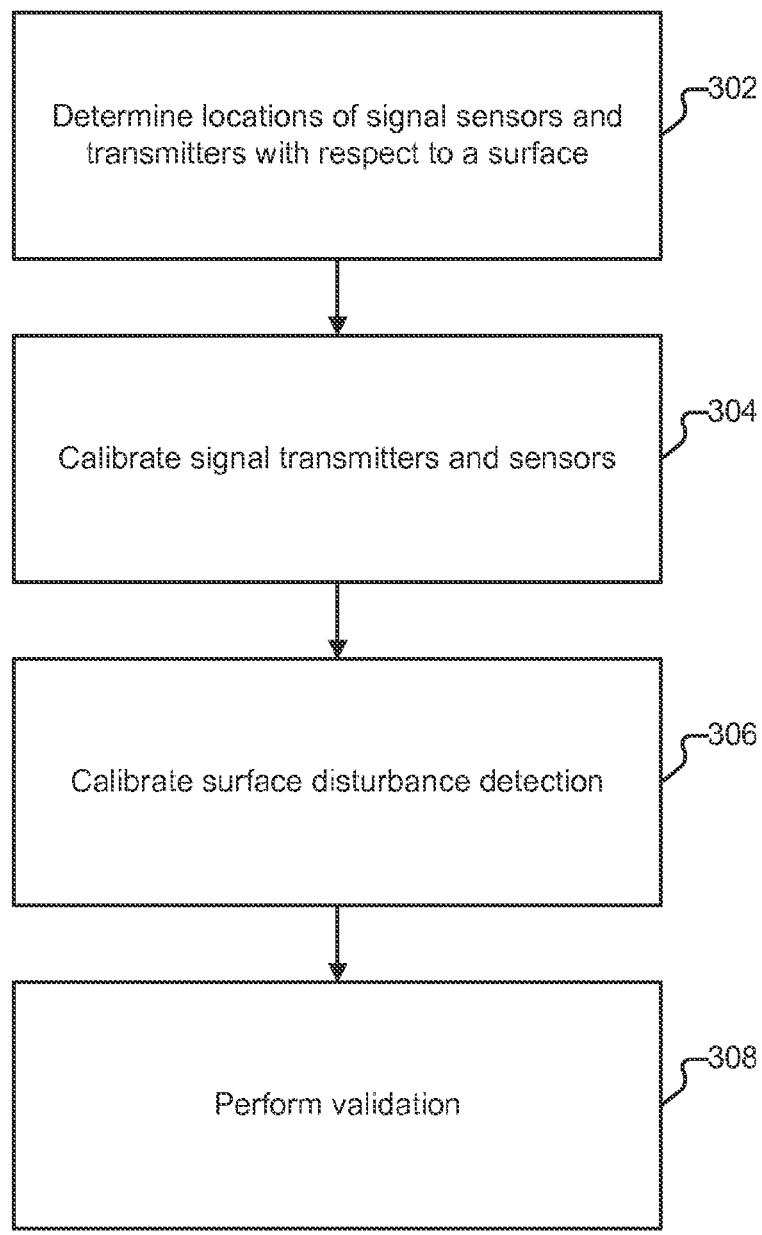
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 3 is used at least in part to calibrate and validate the system of FIG. 1 and/or the system of FIG. 2. At 302, locations of signal transmitters and sensors with respect to a surface are determined. For example, locations of transmitters and sensors shown in FIG. 1 are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal-to-noise transmission/detection of a signal (e.g., acoustic or ultrasonic) to be propagated through a medium and/or a disturbance to be detected. For example, one or more components of the system of FIG. 1 and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selection portion of the predetermined spatial region.

At 306, surface disturbance detection is calibrated. In some embodiments, a test signal is propagated through a medium such as medium 102 of FIG. 1 to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection. In some embodiments, the test signal is used to determine a signal that can be later used to process/filter a detected signal disturbed by a touch input.

In some embodiments, data determined using one or more steps of FIG. 3 is used to determine data (e.g., formula, variable, coefficients, etc.) that can be used to calculate an expected signal that would result when a touch input is provided at a specific location on a touch input surface. For example, one or more predetermined test touch disturbances are applied at one or more specific locations on the touch input surface and a test propagating signal that has been disturbed by the test touch disturbance is used to determine the data (e.g., transmitter/sensor parameters) that is to be used to calculate an expected signal that would result when a touch input is provided at the one or more specific locations.

At 308, a validation of a touch detection system is performed. For example, the system of FIG. 1 and/or FIG. 2 is testing using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
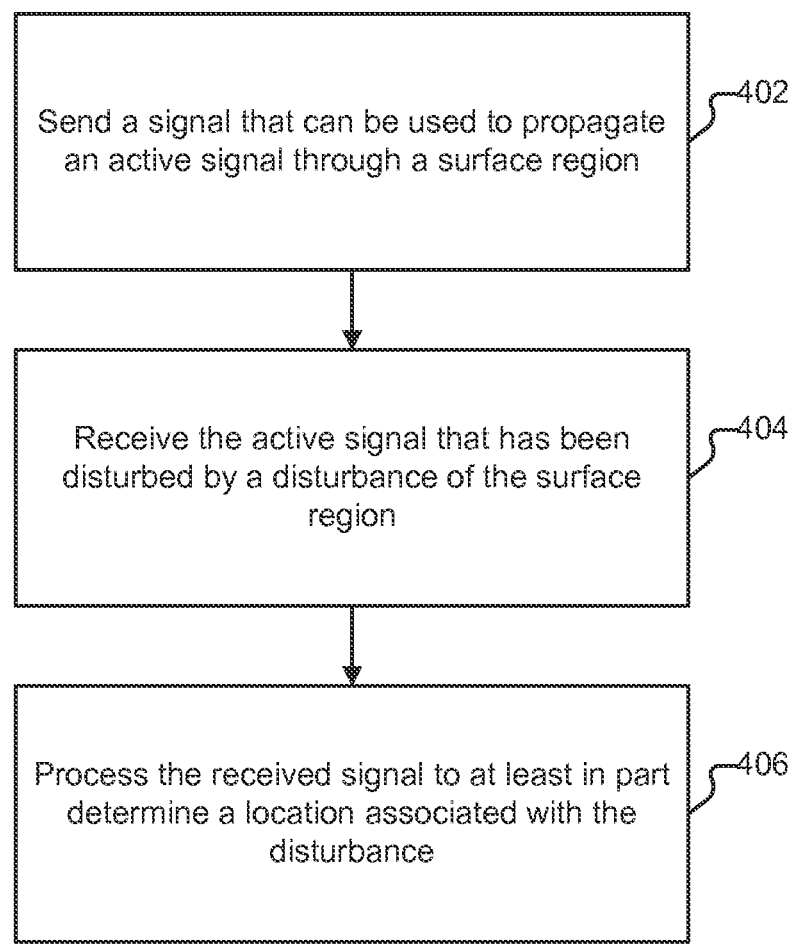
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch detector 120 of FIG. 1 and/or touch detector 202 of FIG. 2.

At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1) to propagate an active signal (e.g., acoustic or ultrasonic mechanical wave) through a propagating medium with the surface region. In some embodiments, the signal includes a sequence selected to optimize autocorrelation (e.g., resulting in narrow/short peaks) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 50 kHz to 500 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

At 404, the active signal that has been disturbed by a disturbance of the surface region is received. The disturbance may be associated with a user touch indication. In some embodiments, the disturbance causes the active signal that is propagating through a medium to be attenuated and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, receiving the received signal and processing the received signal are performed on a periodic interval. For example, the received signal is captured in 5 ms intervals and processed. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes processing the received signal and comparing the processed received signal with a calculated expected signal associated with a hypothesis touch contact location to determine whether a touch contact was received at the hypothesis location of the calculated expected signal. Multiple comparisons may be performed with various expected signals associated with different hypothesis locations until the expected signal that best matches the processed received signal is found and the hypothesis location of the matched expected signal is identified as the touch contact location(s) of a touch input. For example, signals received by sensors (e.g., sensors 112, 114, 116, and 118 of FIG. 1) from various transmitters (e.g., transmitters 104, 106, 108, and 110 of FIG. 1) are compared with corresponding expected signals to determine a touch input location (e.g., single or multi-touch locations) that minimizes the overall difference between all respective received and expected signals.

The location, in some embodiments, is one or more locations (e.g., location coordinate(s)) on the surface region where a user has provided a touch contact. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
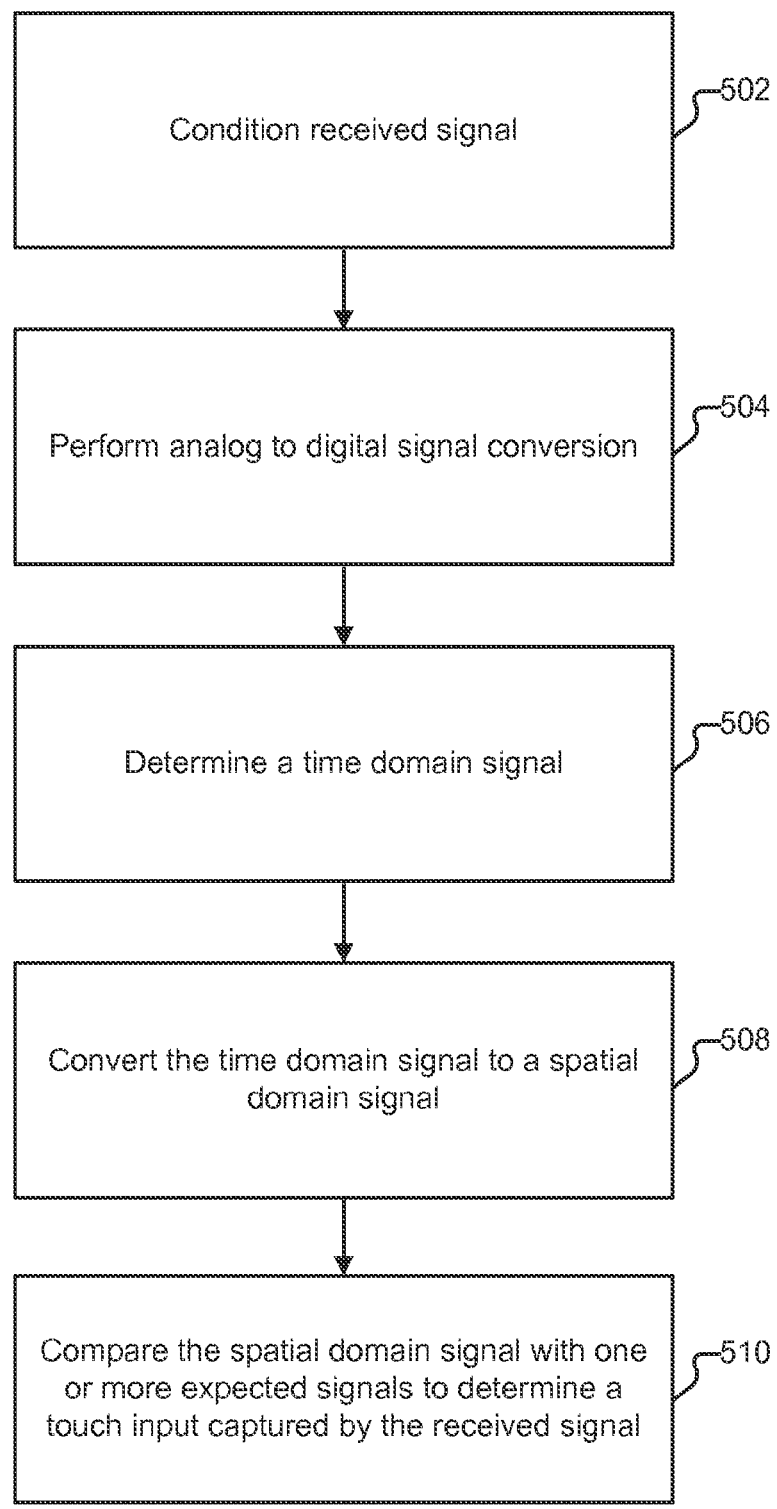
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1 and/or touch detector 202 of FIG. 2. In some embodiments, at least a portion of the process of FIG. 5 is repeated for each combination of transmitter and sensor pair. For example, for each active signal transmitted by a transmitter (e.g., transmitted by transmitter 104, 106, 108, or 110 of FIG. 1), at least a portion of the process of FIG. 5 is repeated for each sensor (e.g., sensors 112, 114, 116, and 118 of FIG. 1) receiving the active signal. In some embodiments, the process of FIG. 5 is performed periodically (e.g., 5 ms periodic interval).

At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal-to-noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used.

At 506, a time domain signal capturing a received signal time delay caused by a touch input disturbance is determined. In some embodiments, determining the time domain signal includes correlating the received signal (e.g., signal resulting from 504) to locate a time offset in the converted signal (e.g., perform pseudorandom binary sequence deconvolution) where a signal portion that likely corresponds to a reference signal (e.g., reference pseudorandom binary sequence that has been transmitted through the medium) is located. For example, a result of the correlation can be plotted as a graph of time within the received and converted signal (e.g., time-lag between the signals) vs. a measure of similarity. In some embodiments, performing the correlation includes performing a plurality of correlations. For example, a coarse correlation is first performed then a second level of fine correlation is performed. In some embodiments, a baseline signal that has not been disturbed by a touch input disturbance is removed in the resulting time domain signal. For example, a baseline signal (e.g., determined at 306 of FIG. 3) representing a measured signal (e.g., a baseline time domain signal) associated with a received active signal that has not been disturbed by a touch input disturbance is subtracted from a result of the correlation to further isolate effects of the touch input disturbance by removing components of the steady state baseline signal not affected by the touch input disturbance.

At 508, the time domain signal is converted to a spatial domain signal. In some embodiments, converting the time domain signal includes converting the time domain signal determined at 506 into a spatial domain signal that translates the time delay represented in the time domain signal to a distance traveled by the received signal in the propagating medium due to the touch input disturbance. For example, a time domain signal that can be graphed as time within the received and converted signal vs. a measure of similarity is converted to a spatial domain signal that can be graphed as distance traveled in the medium vs. the measure of similarity.

In some embodiments, performing the conversion includes performing dispersion compensation. For example, using a dispersion curve characterizing the propagating medium, time values of the time domain signal are translated to distance values in the spatial domain signal. In some embodiments, a resulting curve of the time domain signal representing a distance likely traveled by the received signal due to a touch input disturbance is narrower than the curve contained in the time domain signal representing the time delay likely caused by the touch input disturbance. In some embodiments, the time domain signal is filtered using a match filter to reduce undesired noise in the signal. For example, using a template signal that represents an ideal shape of a spatial domain signal, the converted spatial domain signal is match filtered (e.g., spatial domain signal correlated with the template signal) to reduce noise not contained in the bandwidth of the template signal. The template signal may be predetermined (e.g., determined at 306 of FIG. 3) by applying a sample touch input to a touch input surface and measuring a received signal.

At 510, the spatial domain signal is compared with one or more expected signals to determine a touch input captured by the received signal. In some embodiments, comparing the spatial domain signal with the expected signal includes generating expected signals that would result if a touch contact was received at hypothesis locations. For example, a hypothesis set of one or more locations (e.g., single touch or multi-touch locations) where a touch input might have been received on a touch input surface is determined, and an expected spatial domain signal that would result at 508 if touch contacts were received at the hypothesis set of location(s) is determined (e.g., determined for a specific transmitter and sensor pair using data measured at 306 of FIG. 3). The expected spatial domain signal may be compared with the actual spatial signal determined at 508. The hypothesis set of one or more locations may be one of a plurality of hypothesis sets of locations (e.g., exhaustive set of possible touch contact locations on a coordinate grid dividing a touch input surface).

The proximity of location(s) of a hypothesis set to the actual touch contact location(s) captured by the received signal may be proportional to the degree of similarity between the expected signal of the hypothesis set and the spatial signal determined at 508. In some embodiments, signals received by sensors (e.g., sensors 112, 114, 116, and 118 of FIG. 1) from transmitters (e.g., transmitters 104, 106, 108, and 110 of FIG. 1) are compared with corresponding expected signals for each sensor/transmitter pair to select a hypothesis set that minimizes the overall difference between all respective detected and expected signals. In some embodiments, once a hypothesis set is selected, another comparison between the determined spatial domain signals and one or more new expected signals associated with finer resolution hypothesis touch location(s) (e.g., locations on a new coordinate grid with more resolution than the coordinate grid used by the selected hypothesis set) near the location(s) of the selected hypothesis set is determined.

Figure 6:
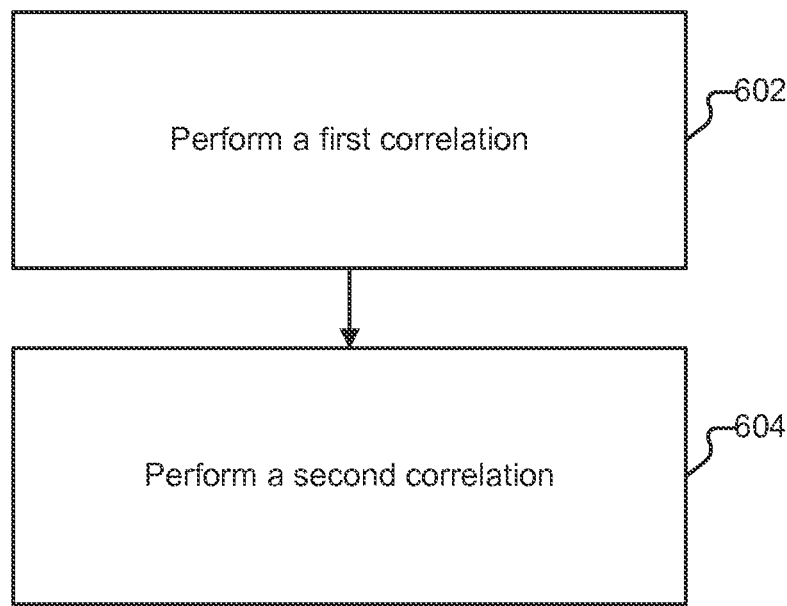
FIG. 6 is a flow chart illustrating an embodiment of a process for determining time domain signal capturing of a disturbance caused by a touch input.

FIG. 6 is a flow chart illustrating an embodiment of a process for determining time domain signal capturing of a disturbance caused by a touch input. In some embodiments, the process of FIG. 6 is included in 506 of FIG. 5. The process of FIG. 6 may be implemented in touch detector 120 of FIG. 1 and/or touch detector 202 of FIG. 2.

At 602, a first correlation is performed. In some embodiments, performing the first correlation includes correlating a received signal (e.g., resulting converted signal determined at 504 of FIG. 5) with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a force associated with a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal is a simplified reference signal that can be used to efficiently correlate the reference signal over a relatively large time difference (e.g., lag-time) between the received and converted signal and the reference signal.

At 604, a second correlation is performed based on a result of the first correlation. Performing the second correlation includes correlating (e.g., cross-correlation or convolution similar to step 602) a received signal (e.g., resulting converted signal determined at 504 of FIG. 5) with a second reference signal. The second reference signal is a more complex/detailed (e.g., more computationally intensive) reference signal as compared to the first reference signal used in 602. In some embodiments, the second correlation is performed because using the second reference signal in 602 may be too computationally intensive for the time interval required to be correlated in 602. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that corresponds to a disturbance caused by a touch input at a location on a surface of a propagating medium. In other embodiments, the second correlation is optional. For example, only a single correlation step is performed. Any number of levels of correlations may be performed in other embodiments.

Figure 7:
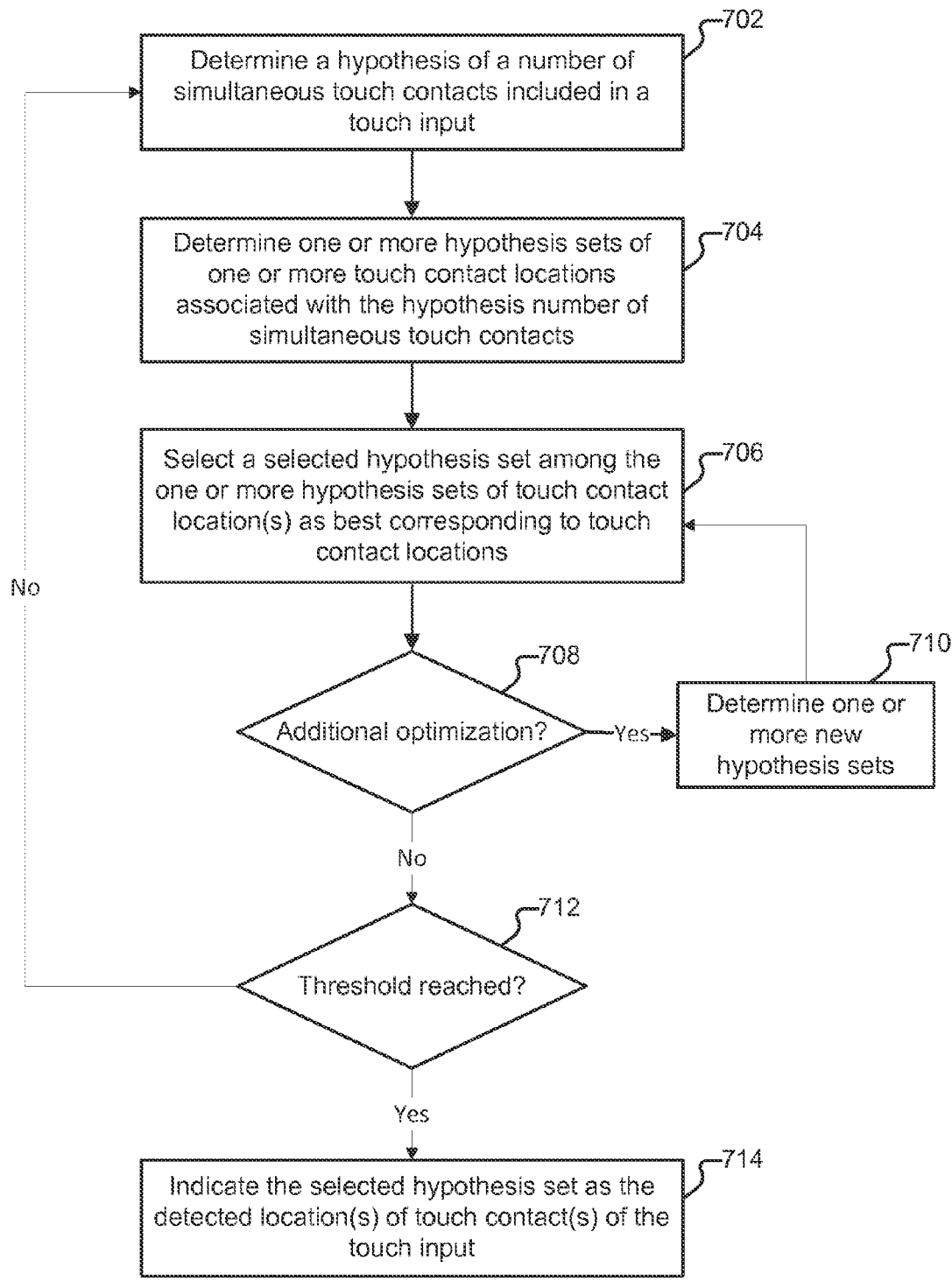
FIG. 7 is a flow chart illustrating an embodiment of a process comparing spatial domain signals with one or more expected signals to determine touch contact location(s) of a touch input.

FIG. 7 is a flow chart illustrating an embodiment of a process comparing spatial domain signals with one or more expected signals to determine touch contact location(s) of a touch input. In some embodiments, the process of FIG. 7 is included in 510 of FIG. 5. The process of FIG. 7 may be implemented in touch detector 120 of FIG. 1 and/or touch detector 202 of FIG. 2.

At 702, a hypothesis of a number of simultaneous touch contacts included in a touch input is determined. In some embodiments, when detecting a location of a touch contact, the number of simultaneous contacts being made to a touch input surface (e.g., surface of medium 102 of FIG. 1) is desired to be determined. For example, it is desired to determine the number of fingers touching a touch input surface (e.g., single touch or multi-touch). In some embodiments, in order to determine the number of simultaneous touch contacts, the hypothesis number is determined and the hypothesis number is tested to determine whether the hypothesis number is correct. In some embodiments, the hypothesis number is initially determined as zero (e.g., associated with no touch input being provided). In some embodiments, determining the hypothesis number of simultaneous touch contacts includes initializing the hypothesis number to be a previously determined number of touch contacts. For example, a previous execution of the process of FIG. 7 determined that two touch contacts are being provided simultaneously and the hypothesis number is set as two. In some embodiments, determining the hypothesis number includes incrementing or decrementing a previously determined hypothesis number of touch contacts. For example, a previously determined hypothesis number is 2 and determining the hypothesis number includes incrementing the previously determined number and determining the hypothesis number as the incremented number (i.e., 3). In some embodiments, each time a new hypothesis number is determined, a previously determined hypothesis number is iteratively incremented and/or decremented unless a threshold maximum (e.g., 10) and/or threshold minimum (e.g., 0) value has been reached.

At 704, one or more hypothesis sets of one or more touch contact locations associated with the hypothesis number of simultaneous touch contacts are determined. In some embodiments, it is desired to determine the coordinate locations of fingers touching a touch input surface. In some embodiments, in order to determine the touch contact locations, one or more hypothesis sets are determined on potential location(s) of touch contact(s) and each hypothesis set is tested to determine which hypothesis set is most consistent with a detected data.

In some embodiments, determining the hypothesis set of potential touch contact locations includes dividing a touch input surface into a constrained number of points (e.g., divide into a coordinate grid) where a touch contact may be detected. For example, in order to initially constrain the number of hypothesis sets to be tested, the touch input surface is divided into a coordinate grid with relatively large spacing between the possible coordinates. Each hypothesis set includes a number of location identifiers (e.g., location coordinates) that match the hypothesis number determined in 702. For example, if two was determined to be the hypothesis number in 702, each hypothesis set includes two location coordinates on the determined coordinate grid that correspond to potential locations of touch contacts of a received touch input. In some embodiments, determining the one or more hypothesis sets includes determining exhaustive hypothesis sets that exhaustively cover all possible touch contact location combinations on the determined coordinate grid for the determined hypothesis number of simultaneous touch contacts. In some embodiments, a previously determined touch contact location(s) of a previous determined touch input is initialized as the touch contact location(s) of a hypothesis set.

At 706, a selected hypothesis set is selected among the one or more hypothesis sets of touch contact location(s) as best corresponding to touch contact locations captured by detected signal(s). In some embodiments, one or more propagated active signals (e.g., signal transmitted at 402 of FIG. 4) that have been disturbed by a touch input on a touch input surface are received (e.g., received at 404 of FIG. 4) by one or more sensors such as sensors 112, 114, 116, and 118 of FIG. 1. Each active signal transmitted from each transmitter (e.g., different active signals each transmitted by transmitters 104, 106, 108, and 110 of FIG. 1) is received by each sensor (e.g., sensors 112, 114, 116, and 118 of FIG. 1) and may be processed to determine a detected signal (e.g., spatial domain signal determined at 508 of FIG. 5) that characterizes a signal disturbance caused by the touch input. In some embodiments, for each hypothesis set of touch contact location(s), an expected signal is determined for each signal expected to be received at one or more sensors. The expected signal may be determined using a predetermined function that utilizes one or more predetermined coefficients (e.g., coefficient determined for a specific sensor and/or transmitter transmitting a signal to be received at the sensor) and the corresponding hypothesis set of touch contact location(s). The expected signal(s) may be compared with corresponding detected signal(s) to determine an indicator of a difference between all the expected signal(s) for a specific hypothesis set and the corresponding detected signals. By comparing the indicators for each of the one or more hypothesis sets, the selected hypothesis set may be selected (e.g., hypothesis set with the smallest indicated difference is selected).

At 708, it is determined whether additional optimization is to be performed. In some embodiments, determining whether additional optimization is to be performed includes determining whether any new hypothesis set(s) of touch contact location(s) should be analyzed in order to attempt to determine a better selected hypothesis set. For example, a first execution of step 706 utilizes hypothesis sets determined using locations on a larger distance increment coordinate grid overlaid on a touch input surface and additional optimization is to be performed using new hypothesis sets that include locations from a coordinate grid with smaller distance increments. Additional optimizations may be performed any number of times. In some embodiments, the number of times additional optimizations are performed is predetermined. In some embodiments, the number of times additional optimizations are performed is dynamically determined. For example, additional optimizations are performed until a comparison threshold indicator value for the selected hypothesis set is reached and/or a comparison indicator for the selected hypothesis does not improve by a threshold amount. In some embodiments, for each optimization iteration, optimization may be performed for only a single touch contact location of the selected hypothesis set and other touch contact locations of the selected hypothesis may be optimized in a subsequent iteration of optimization.

If at 708 it is determined that additional optimization should be performed, at 710, one or more new hypothesis sets of one or more touch contact locations associated with the hypothesis number of the touch contacts are determined based on the selected hypothesis set. In some embodiments, determining the new hypothesis sets includes determining location points (e.g., more detailed resolution locations on a coordinate grid with smaller distance increments) near one of the touch contact locations of the selected hypothesis set in an attempt to refine the one of the touch contact locations of the selected hypothesis set. The new hypothesis sets may each include one of the newly determined location points, and the other touch contact location(s), if any, of a new hypothesis set may be the same locations as the previously selected hypothesis set. In some embodiments, the new hypothesis sets may attempt to refine all touch contact locations of the selected hypothesis set. The process proceeds back to 706, whether or not a newly selected hypothesis set (e.g., if previously selected hypothesis set still best corresponds to detected signal(s), the previously selected hypothesis set is retained as the new selected hypothesis set) is selected among the newly determined hypothesis sets of touch contact location(s).

If at 708 it is determined that additional optimization should not be performed, at 712, it is determined whether a threshold has been reached. In some embodiments, determining whether a threshold has been reached includes determining whether the determined hypothesis number of contact points should be modified to test whether a different number of contact points have been received for the touch input. In some embodiments, determining whether the threshold has been reached includes determining whether a comparison threshold indicator value for the selected hypothesis set has been reached and/or a comparison indicator for the selected hypothesis did not improve by a threshold amount since a previous determination of a comparison indicator for a previously selected hypothesis set. In some embodiments, determining whether the threshold has been reached includes determining whether a threshold amount of energy still remains in a detected signal after accounting for the expected signal of the selected hypothesis set. For example, a threshold amount of energy still remains if an additional touch contact needs be included in the selected hypothesis set.

If at 712, it is determined that the threshold has not been reached, the process continues to 702 where a new hypothesis number of touch inputs is determined. The new hypothesis number may be based on the previous hypothesis number. For example, the previous hypothesis number is incremented by one as the new hypothesis number.

If at 712, it is determined that the threshold has been reached, at 714, the selected hypothesis set is indicated as the detected location(s) of touch contact(s) of the touch input. For example, a location coordinate(s) of a touch contact(s) is provided.

Figure 8:
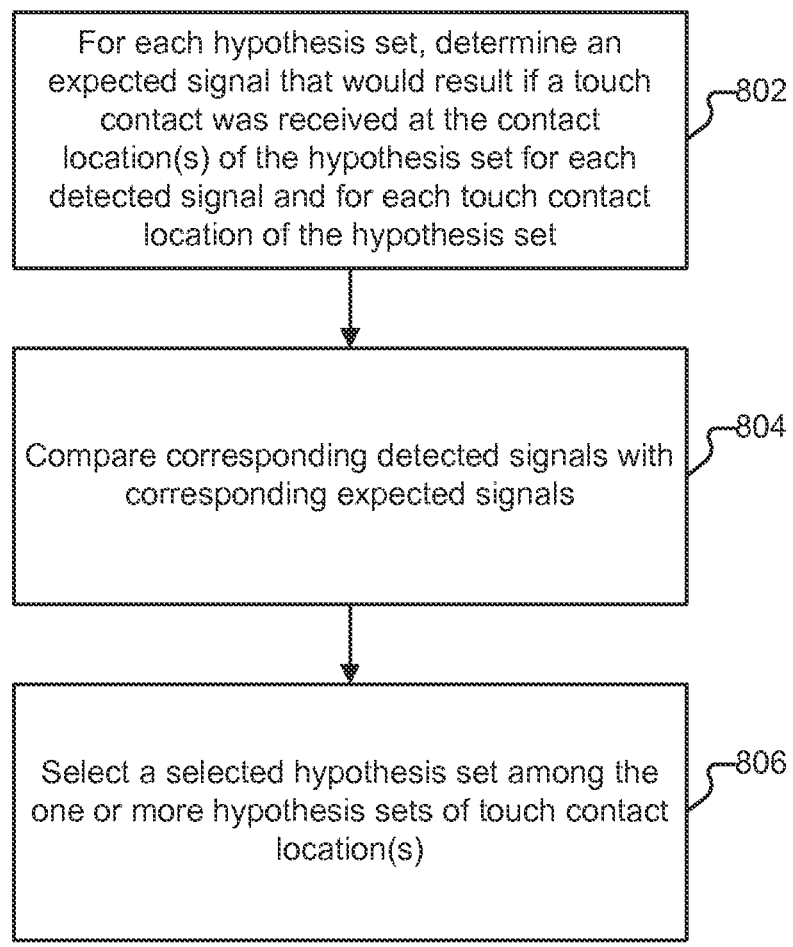
FIG. 8 is a flow chart illustrating an embodiment of a process for selecting a selected hypothesis set of touch contact location(s).

FIG. 8 is a flow chart illustrating an embodiment of a process for selecting a selected hypothesis set of touch contact location(s). In some embodiments, the process of FIG. 8 is included in 706 of FIG. 7. The process of FIG. 8 may be implemented in touch detector 120 of FIG. 1 and/or touch detector 202 of FIG. 2.

At 802, for each hypothesis set (e.g., determined at 704 of FIG. 7), an expected signal that would result if a touch contact was received at the contact location(s) of the hypothesis set is determined for each detected signal and for each touch contact location of the hypothesis set. In some embodiments, determining the expected signal includes using a function and one or more function coefficients to generate/simulate the expected signal. The function and/or one or more function coefficients may be predetermined (e.g., determined at 306 of FIG. 3) and/or dynamically determined (e.g., determined based on one or more provided touch contact locations). In some embodiments, the function and/or one or more function coefficients may be determined/selected specifically for a particular transmitter and/or sensor of a detected signal. For example, the expected signal is to be compared to a detected signal and the expected signal is generated using a function coefficient determined specifically for the pair of transmitter and sensor of the detected signal. In some embodiments, the function and/or one or more function coefficients may be dynamically determined.

In some embodiments, in the event the hypothesis set includes more than one touch contact location (e.g., multi-touch input), expected signal for each individual touch contact location is determined separately and combined together. For example, an expected signal that would result if a touch contact was provided at a single touch contact location is added with other single touch contact expected signals (e.g., effects from multiple simultaneous touch contacts add linearly) to generate a single expected signal that would result if the touch contacts of the added signals were provided simultaneously.

In some embodiments, the expected signal for a single touch contact is modeled as the function:

$$C*P(x-d)$$

where C is a function coefficient (e.g., complex coefficient) and P(x) is a function and d is the total path distance between a transmitter (e.g., transmitter of a signal desired to be simulated) to a touch input location and between the touch input location and a sensor (e.g., receiver of the signal desired to be simulated).

In some embodiments, the expected signal for one or more touch contacts is modeled as the function:

$$\sum_{j=1}^{N} C_j P(x - d_j)$$

where j indicates which touch contact and N is the number of total simultaneous touch contacts being modeled (e.g., hypothesis number determined at 702 of FIG. 7).

At 804, corresponding detected signals are compared with corresponding expected signals. In some embodiments, the detected signals include spatial domain signals determined at 508 of FIG. 5. In some embodiments, comparing the signals includes determining a mean square error between the signals. In some embodiments, comparing the signals includes determining a cost function that indicates the similarity/difference between the signals. In some embodiments, the cost function for a hypothesis set (e.g., hypothesis set determined at 704 of FIG. 7) analyzed for a single transmitter/sensor pair is modeled as:

$$\varepsilon(r_x, t_x) = \left| q(x) - \sum_{j=1}^{N} C_j P(x - d_j) \right|^2$$

where $\varepsilon(r_x, t_x)$ is the cost function, $q(x)$ is the detected signal, and $\sum_{j=1}^{N} C_j P(x-d_j)$ is the expected signal. In some embodiments, the global cost function for a hypothesis set analyzed for more than one (e.g., all) transmitter/sensor pair is modeled as:

$$\varepsilon = \sum_{i=1}^{Z} \varepsilon(r_x, t_x)_i$$

where $\varepsilon$ is the global cost function, Z is the number of total transmitter/sensor pairs, i indicates the particular transmitter/sensor pair, and $\varepsilon(r_x, t_x)_i$ is the cost function of the particular transmitter/sensor pair.

At 806, a selected hypothesis set of touch contact location(s) is selected among the one or more hypothesis sets of touch contact location(s) as best corresponding to detected signal(s). In some embodiments, the selected hypothesis set is selected among hypothesis sets determined at 704 or 710 of FIG. 7. In some embodiments, selecting the selected hypothesis set includes determining the global cost function (e.g., function $\varepsilon$ described above) for each hypothesis set in the group of hypothesis sets and selecting the hypothesis set that results in the smallest global cost function value.

FIGS. 9A1-9E1 and 9A2-9E2 are diagrams illustrating an example of a process for coupling an electronic component to a touch input medium. FIGS. 9A1-9E1 show successive views of steps used to couple the electronic component to the touch input medium. In some embodiments, touch input medium 902 is medium 102 of FIG. 1. For example the views shown in FIGS. 9A1-9E1 show a surface of touch input medium 902 that is the same surface of medium 102 shown in FIG. 1. In some embodiments, FIGS. 9A1-9E1 show a view of a first surface of touch input medium 902 that is opposite from a second surface of touch input medium 902 where a user may contact touch input medium 902 to provide a touch input. FIGS. 9A2-9E2 show a cross sectional view (e.g., cross sectional side view) of touch input medium 902. FIGS. 9A2-9E2 are corresponding cross sectional views of FIGS. 9A1-9E1. FIGS. 9A1-9E1 and 9A2-9E2 are not to scale and have been simplified to illustrate the embodiment clearly.

Only a portion of medium 902 is shown in FIGS. 9A1-9E1 and 9A2-9E2. In some embodiments, medium 902 is a portion of medium 102 of FIG. 1. In some embodiments, area 932 is a portion of border area 132 of FIG. 1. For example, area 932 has been coated with covering layer 933 (e.g., paint, colored epoxy, other attached non-transparent material, etc.) to make area 932 non-transparent (e.g., to visually hide electronics and conductive traces to a user viewing medium 902 from an opposite surface of the shown surface exposed to the electronic components and conductive traces). In some embodiments, layer 933 is an electronically insulating layer. In some embodiments, conductive trace 904 and conductive trace 906 are included in conductive traces 134 of FIG. 1. Only a portion of conductive trace 904 and conductive trace 906 is shown in FIGS. 9A1-9E1 and 9A2-9E2. For example, FIGS. 9A1-9E1 and 9A2-9E2 show only portions of conductive trace 904 and conductive trace 906 that comprise and surround electrical contact pads formed by conductive trace 904 and conductive trace 906.

Figure 10:
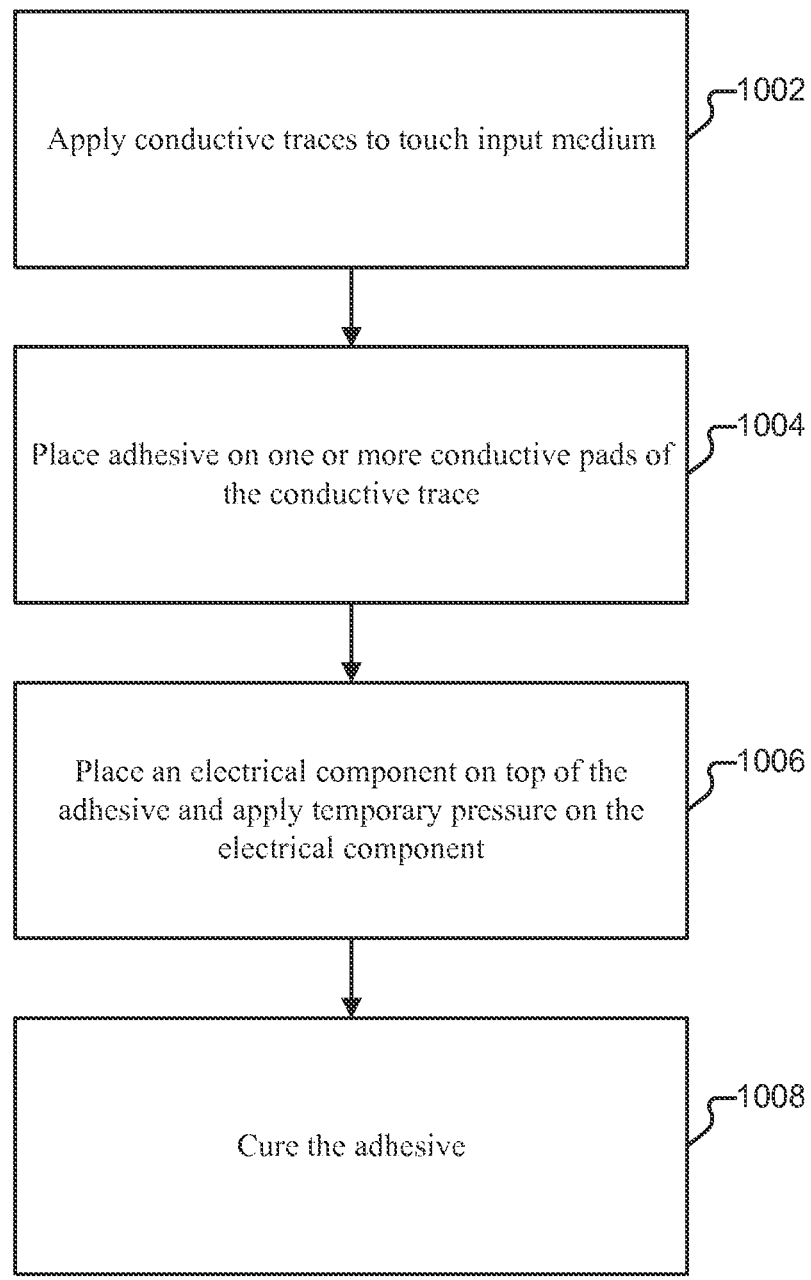
FIG. 10 is a flowchart illustrating an embodiment of a process for coupling an electronic component to a touch input medium.

FIG. 10 is a flowchart illustrating an embodiment of a process for coupling an electronic component to a touch input medium. In some embodiments, the process of FIG. 10 is used to couple at least a portion of the elements shown in FIG. 1. In some embodiments, FIGS. 9A1-9E1 and 9A2-9E2 illustrate at least a portion of the process of FIG. 10.

At 1002, conductive traces are applied to a surface of a touch input medium. Examples of conductive traces include silver trace, copper trace, carbon trace, a conductive material mixed with an adhesive, and Indium tin oxide trace coupled to the touch input medium. Conductive traces may have been applied to the touch input medium by printing the conductive material onto touch input medium and/or by sputtering conductive material onto the touch input medium and etching away undesired portions of the conductive material on the touch input medium. In some embodiments, the conductive traces include conductive traces 134 of FIG. 1. In some embodiments, the conductive traces are applied on top of a covering material (e.g., paint, epoxy, colored epoxy, other attached non-transparent material, electrically insulating material, etc.) applied to at least a portion of a surface of the touch input medium. In some embodiments, the applied conductive traces include conductive trace 904 and conductive trace 906 shown in FIGS. 9A1 and 9A2. FIGS. 9A1 and 9A2 illustrate step 1002.

FIG. 9A1 shows conductive trace 904 and conductive trace 906 applied/coupled to area 932 of medium 902. Outline 905 outlines a portion of conductive trace 904 that has been applied to create an electrical pad to be electrically coupled to an electrical terminal of a transducer component (e.g., transmitters 104, 106, 108, or 110 or sensors 112, 114, 116, or 118 of FIG. 1). Outline 907 outlines a portion of conductive trace 906 that has been applied to create an electrical pad to be electrically coupled to an electrical terminal of a transducer component (e.g., transmitters 104, 106, 108, or 110 or sensors 112, 114, 116, or 118 of FIG. 1). The pads outlined by outline 905 and outline 907 include areas at least in part surrounded by conductive trace lines where an adhesive may flow to attach a portion of area 932 to a component placed on top of the pads. For example, the electrical pads are not entirely covered with conductive trace material. Instead, the pads include peaks (e.g., created by conductive trace) and valleys (e.g., area without conductive trace material between or next to conductive trace of the pad) where adhesive may flow in to make contact with an underlying material. In some embodiments, at least a portion of the conductive traces of the pads outlined by outline 905 and outline 907 are higher/raised as compared to other portions of connected conductive traces.

FIG. 9A2 shows a cross sectional view of the example shown in FIG. 9A1. Covering layer 933 is a layer of covering material (e.g., paint, epoxy, colored epoxy, other attached non-transparent material, electrically insulating material, etc.) applied to area 932 shown in FIG. 9A1. Covering layer 933 may hide objects behind covering layer 933 when viewed from surface 901 of medium 902. In some embodiments, covering layer 933 electrically isolates conductive trace 904 and conductive trace 906 from medium 902. The pads outlined by outline 905 and outline 907 show a cross sectional view of pads outlined by outline 905 and outline 907 in FIG. 9A1. Voids/open areas (e.g., areas without conductive trace material between or next to conductive trace of the pad) present in the pads outlined by outline 905 and outline 907 are defined by the solid and dashed vertical lines within conductive trace 904 and conductive trace 906 of outline 905 and outline 907. In some embodiments, the pads outlined by outline 905 and outline 907 include higher/raised portions as compared to other portions of conductive traces connected to each of the pads. The higher/raised portions may be utilized to contact electrical terminals of an electrical component (e.g., transducer) to be placed on top of the pads.

At 1004, an adhesive is placed on one or more conductive pads of the conductive trace. Examples of the adhesive include an epoxy, a low viscosity (e.g., 200-400 Centipoise) adhesive, a non-conductive adhesive, a low viscosity non-conductive epoxy, or an ultra-violet light curable low viscosity non-conductive epoxy. In some embodiments, a low viscosity adhesive is desired to allow the adhesive to easily flow away to sides of the conductive trace/pad to allow a component placed on top of the pad to make direct physical contact with the pad while allowing the adhesive to bond to a material underlying the conductive trace with the component placed on top of the conductive pad.

In some embodiments, the placed adhesive includes adhesive 940 shown in FIGS. 9B1 and 9B2. FIG. 9B1 includes components shown in FIG. 9A1 and illustrate step 1004. Adhesive 940 has been placed on top of at least a portion of pad regions outlined in outline 905 and outline 907 of FIG. 9A1. Although FIG. 9B1 shows a single drop of adhesive 940, in other examples, more than one drop (e.g., a first drop for the pad of outline 905 and a second drop for the pad of outline 907) of adhesive may be utilized. FIG. 9B2 shows a cross-sectional view of the example shown in FIG. 9B1. FIG. 9B2 includes components shown in FIG. 9A2. Although FIG. 9B2 shows a single drop of adhesive 940, in other examples, more than one drop (e.g., a first drop for the pad of outline 905 and a second drop for the pad of outline 907) of adhesive may be utilized.

At 1006, an electrical component is placed on top of the adhesive and temporary pressure is applied on the electrical component. In some embodiments, placing the electrical component includes aligning one or more electrical terminals of the electrical components with one or more pads formed by conductive traces. Examples of the electrical component include a chip, a packaged electrical component, a transducer, or a transmitter or a sensor shown in FIG. 1. In some embodiments, applying the pressure includes temporarily applying enough pressure to allow electrical terminals of the electrical component to make contact with one or more pads of the conductive traces by displacing a placed adhesive. The pressure may be applied for a time period less than a time required to at least substantially cure the adhesive. For example, although in prior approaches when attaching a component using an adhesive, pressure was applied on the component until the adhesive was fully cured, the pressure is applied (e.g., without relation to cure time of the adhesive) for a duration (e.g., less than a few seconds) less than the cure time of the adhesive.

In some embodiments, heat (e.g., temperature between 85-120 degrees Celsius) is applied while applying the pressure. The heat may allow the adhesive to start curing and increase bonding strength of the adhesive (e.g., to allow the adhesive to hold the position of the electrical component when the pressure was applied without the applied pressure). The heat may be applied to increase viscosity of the adhesive (e.g. to encourage flow of the adhesive away from a top surface of the conductive trace pad where a contact is to be made with an electrical terminal of the electrical component). The temperature of the heat may be selected to be at least a curing temperature of the adhesive but less than a Curie temperature of the electrical component (e.g., Curie temperature of a piezoelectric component). In some embodiments, an ultra-violet light is applied to the adhesive while applying the pressure (e.g., when ultra-violet light curable adhesive is utilized).

An example of the electrical component placed on top of the adhesive is shown in FIGS. 9C1 and 9C2. FIG. 9C1 includes components shown in FIG. 9B1 and illustrates an example of step 1006. Component 950 has been placed on top of adhesive 940 shown in FIG. 9B1. Pressure is applied on top of component 950 in a downward direction towards area 932 and medium 902. In some embodiments, enough pressure is applied to allow electrical terminals of component 950 to make contact with pads outlined by outline 905 and outline 907 (shown in FIG. 9A1) by displacing adhesive 940. FIG. 9C2 shows a cross-sectional view of the example shown in FIG. 9C1. FIG. 9C2 includes components shown in FIG. 9B2. Component 950 has been placed on top of adhesive 940. Pressure is applied on top of component 950 in a downward direction towards medium 902. In some embodiments, enough pressure applied to allow electrical terminals 952 and 954 of component 950 to make contact with pads outlined by outline 905 and outline 907 in FIG. 9A1 by displacing adhesive 940.

An example of a result of applying the temporary pressure in 1006 is shown in FIGS. 9D1 and 9D2. FIG. 9D1 includes components shown in FIG. 9C1. Electrical terminals of component 950 make contact with pads outlined by outline 905 and outline 907 (shown in FIG. 9A1) after the pressure has been applied. FIG. 9D2 shows a cross-sectional view of the example shown in FIG. 9D1. FIG. 9D2 includes components shown in FIG. 9C2. Electrical terminals 952 and 954 of component 950 (shown in FIG. 9C2) make contact with pads outlined by outline 905 and outline 907 in FIG. 9A2 after the pressure has been applied. Due to the pressure and flow of adhesive 940, adhesive 940 has been displaced into areas around electrical terminals 952 and 954. The displacement has allowed the adhesive to physically couple component 950 with medium 902 via layer 933 and conductive traces 904 and 906.

At 1008, the adhesive is cured. In some embodiments, curing the adhesive includes allowing time to pass to allow the adhesive to solidify, harden, and/or become more viscous to allow the adhesive to bond/attach materials in contact with the adhesive together. In some embodiments, curing the adhesive includes thermal curing the adhesive. For example, heat is applied (e.g., adhesive and attached components are placed in an oven) for a determined amount of time. In some embodiments, the adhesive physically bonds the electrical component to the touch input medium. This may allow the electrical terminals of the electrical component to maintain physical and electrical contact with conductive traces on the touch input medium. In some embodiments, the cured adhesive bond allows the electrical component to transmit and/or detect mechanical vibration on the touch input medium. For example, the adhesive is hardened during the curing process and the adhesive transfers vibrational energy between the electrical component (e.g., transducer) and the touch input medium.

An example of the cured adhesive is shown in FIGS. 9E1 and 9E2. FIG. 9E1 includes components shown in FIG. 9D1 and illustrates an example of a result of step 1008. Component 950 is physically coupled with medium 902 via a cured adhesive (adhesive 940). FIG. 9E2 shows a cross sectional view of the example shown in FIG. 9E1. FIG. 9E2 includes components shown in FIG. 9D2. Component 950 is physically coupled with medium 902 via cured adhesive 940.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A touch input device, comprising:
a touch input medium configured to receive a touch input;
a first conductive trace coupled to the touch input medium, wherein the first conductive trace forms a first electrical connection pad on the touch input medium;
a second conductive trace coupled to the touch input medium, wherein the second conductive trace forms a second electrical connection pad on the touch input medium; and
a transducer electrically coupled to the first conductive trace and the second conductive trace and coupled to the touch input medium via a non-conductive adhesive, wherein
the first electrical connection pad includes a first plurality of void areas between segments of the first conductive trace, and the non-conductive adhesive in each of the first plurality of void areas of the first electrical connection pad couples a first connection terminal on the transducer to the touch input medium through the first plurality of void areas of the first electrical connection pad, and
the second electrical connection pad includes a second plurality of void areas between segments of the second conductive trace, and the non-conductive adhesive in each of the second plurality of void areas of the second electrical connection pad couples a second connection terminal on the transducer to the touch input medium through the second plurality of void areas of the second electrical connection pad;
wherein a conductive adhesive is not utilized in coupling the first connection terminal on the transducer or the second connection terminal on the transducer to the touch input medium.

2. The device of claim 1, wherein the touch input medium is a metal.

3. The device of claim 1, wherein the touch input medium covers an electronic display.

4. The device of claim 1, wherein the touch input includes a human finger touch input.

5. The device of claim 1, wherein the first conductive trace includes a silver trace.

6. The device of claim 1, wherein the first conductive trace is coupled to a colored epoxy coupled to a surface of the touch input medium and the colored epoxy renders at least a portion of the touch input medium non-transparent.

7. The device of claim 1, wherein the first conductive trace has been printed.

8. The device of claim 1, wherein the first conductive trace has been formed at least in part by etching.

9. The device of claim 1, wherein the first conductive trace is electrically connected to a cable connector.

10. The device of claim 1, wherein the first plurality of void areas includes a first void area that is partially enclosed by at least a portion of the segments of the first conductive trace forming sidewalls with an opening that allows the non-conductive adhesive to flow out of the first void area.

11. The device of claim 1, wherein each of the first plurality of void areas is partially enclosed by at least a portion of the segments of the first conductive trace forming sidewalls containing the non-conductive adhesive.

12. The device of claim 1, wherein the transducer is a piezoelectric transducer.

13. The device of claim 1, wherein the transducer is configured to transmit a mechanical vibration through the touch input medium via the non-conductive adhesive.

14. The device of claim 1, wherein the transducer is configured to detect a mechanical vibration on the touch input medium via the non-conductive adhesive.

15. The device of claim 1, wherein the non-conductive adhesive is a low viscosity non-conductive epoxy.

16. The device of claim 1, wherein one or more of the non-conductive adhesive included in each of the first plurality of void areas exhibit a displacement flowed shape.

17. The device of claim 1, further comprising a processor configured to process a disturbed active signal, compare the processed signal with a reference signal and determine a location of a touch input on the touch input medium based on the comparison, wherein the disturbed active signal is a detected version of an active signal that was disturbed by the touch input, and the active signal including a pseudorandom binary sequence is propagated by the transducer through the touch input medium.

* * * * *